May 3, 1966  YUJI KOBAYASHI ETAL  3,248,753
APPARATUS FOR SIMULTANEOUSLY BIAXIALLY STRETCHING
THERMOPLASTIC FILM
Filed Sept. 5, 1961  2 Sheets-Sheet 1

United States Patent Office 3,248,753
Patented May 3, 1966

3,248,753
APPARATUS FOR SIMULTANEOUSLY BIAXIALLY STRETCHING THERMOPLASTIC FILM
Yuji Kobayashi, Nobeoka-shi, Noboru Fukuma, Ibaragi-shi, and Saburoe Yamada and Atsushi Kitaoka, Takatsuki-shi, Japan, assignors to Asahi Kasei Kogyo Kabushiki Kaisha, Osaka, Japan, a corporation of Japan
Filed Sept. 5, 1961, Ser. No. 135,965
Claims priority, application Japan, Sept. 5, 1960, 35/36,884
1 Claim. (Cl. 18—1)

The present invention relates to apparatus for stretching thermoplastic films.

In the past, there have been proposed various methods of improving mechanical properties of thermoplastic films, in which such film is stretched only in one direction longitudinal or transverse, or in two directions, firstly longitudinal and then tranverse or vice versa. The term "longitudinal" or "longitudinally" as employed herein corresponds to the direction in which the film proceeds as it is extruded in the usual manner through a T die mounted on an extruder head. Similarly, the term "transverse" or "transversely" corresponds to the direction of film travel or the "longitudinal" direction. With films formed by an other process, the same terminology may also be employed with similar connotations.

It is known that thermoplastic films stretched only in one direction, longitudinal or transverse, exhibit different characteristic properties depending upon whether they are tested in the direction of stretch or in the direction at right angles thereto, and thus are generally unsatisfactory. It is also known that satisfactory thermoplastic films, which have uniform characteristics in all directions, may be obtained only when stretched evenly in both longitudinal and transverse directions.

The inventors have made various investigations for the purpose of obtaining such films having improved and uniform properties in all directions by employing the method in which the films are stretched first longitudinally and then transversely or vice versa, and have found that, in the case of films of some resins, particularly polypropylene films principally comprising crystalline polymers, it is extremely difficult to stretch such films to substantially the same extent both in the longitudinal and transverse directions.

In other words, it has been found that if these films are stretched in both longitudinal and transverse directions to substantially the same extent and sufficient to enhance the qualities of such films, the latter tend to be torn or unevenly elongated at places particularly when stretched for the second time.

To avoid such difficulties, the films may first be stretched to a relatively low extent and then to a relatively high extent. In this case, however, the resulting products exhibit materially varying characteristics depending upon the direction in which they are tested.

It has also been found that the above-pointed-out deficiency of the method in which a film is stretched successively in the longitudinal and transverse directions may be avoided by stretching an unstretched film simultaneously in both longitudinal and transverse directions.

Accordingly, the present invention has for its object to provide a novel apparatus for stretching thermoplastic films simultaneously in both longitudinal and transverse directions in a continuous manner.

According to one aspect of the present invention, there is provided a method of stretching a thermoplastic film which is characterized by stretching the film simultaneously in both longitudinal and transverse directions in a continuous manner by use of an apparatus as referred to above and as described below in detail.

According to another aspect of the present invention, there is provided an apparatus for biaxially stretching a flat thermoplastic film which comprises (I) at least one set of feed rolls, (II) at least one set of tension or pull rolls for stretching the film in the longitudinal direction, and (III) endless guide means arranged intermediate said feed and pull roll sets and including a pair of opposite endless guide tracks each for conducting a series of film-clamps adapted to engage the adjacent marginal edges of the film to be stretched and adapted to operate independently from each other. The apparatus may further comprise heating means for heating the flat film before and after it has been stretched.

The above and other objects, advantages and features of the present invention will be apparent from the following embodiment given by way of example only and illustrated in the accompanying drawings wherein.

Figure 1:
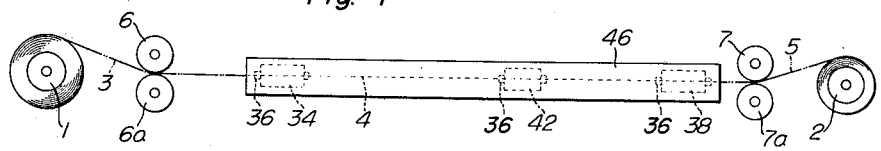
FIG. 1 is a diagrammatic side elevation of the apparatus embodying the present invention.
Figure 2:
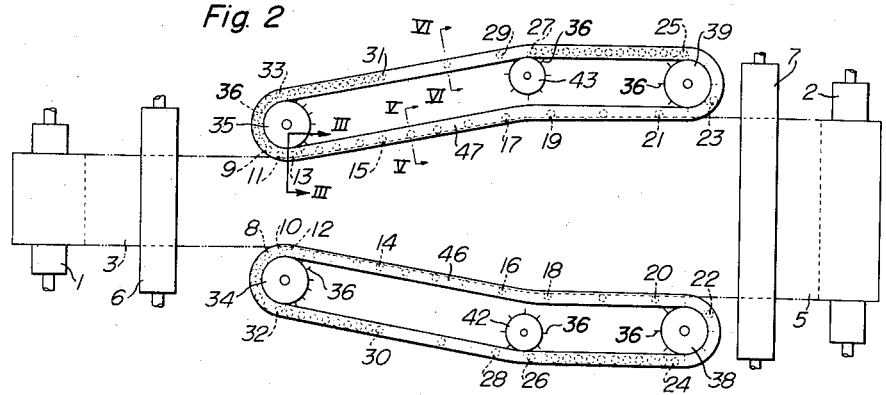
FIG. 2 is a top plan view of the apparatus shown in FIG. 1.

Referring to the drawings, particularly to FIGS. 1 and 2, there is diagrammatically shown an apparatus for stretching thermoplastic resin films according to the present invention which comprises a supply roll including a bobbin 1 carrying unstretched flat films wound thereon, and a take-up roll 2 for winding the stretched film under constant tension. Numeral 3 designates the flat film prior to stretching, 4 the flat film being stretched; and 5 the flat film after it has been stretched.

Numerals 6, 6a, 7 and 7a designate respective elements forming a mechanism for stretching the flat film longitudinally. Numerals 6 and 6a designate a pair of feed rolls or rollers which are arranged to be driven by a variable speed drive and one of which is adapted to be pressed against the other by pneumatic or spring means so that the unstretched film being fed may be prevented from slipping upon the roll. Numerals 7 and 7a designate a pair of tension or pull rolls or rollers which are also arranged to be driven by a variable speed drive mechanism.

The pull roll assembly 7–7a is generally of the same construction as feed roll assembly 6–6a except that the former is adapted to operate at a peripheral speed which may be a number of times greater than that of the roll assembly 6–6a depending upon the desired stretching ratio in the longitudinal direction.

Numerals 8 to 47 inclusive designate elements constituting means for stretching the flat film in the transverse direction. The latter means comprises a multitude of mutually independent film-clamps or gripping devices 8 to 33, a pair of closed or endless guide track members or rails 46 and 47, and a number of sprocket wheels 34, 35, 38, 29, 42, 43 arranged within said guide track members for conducting said film-clamps around the endless guide track member 46 or 47.

Though a pair of endless guide tracks which are divergent relative to the direction of advancement of the film are illustrated in FIG. 2, they may also be parallel or even convergent.

The film-clamps 8 to 33 are shown in broken lines as small circles in FIG. 2, and will now be described in detail with reference to FIGS. 3 and 4. Each of the film-clamps includes an upper jaw piece 50 and a lower jaw piece 51 which are mounted on respective shafts 52. Each of shafts 52 carry at opposite ends extending beyond the respective jaw piece a pair of freely rotatable wheels 53. The upper jaw piece carries a semispherical bulge or projection 54 formed on the jaw face opposing the lower jaw piece 51. The jaw face of the latter carries a facing 58 of elastic material such as rubber adhesively connected to the jaw face, which has formed therein a semi-spherical recess 57 for receiving said projection 54 on the upper jaw piece. Formed in the lower jaw piece is a cylindrical bore 59 which is disposed to loosely receive a cylindrical lug 55 extending downwardly from the jaw face of the upper jaw piece for free relative sliding movement. A spring 60 is accommodated in the bore 59 to bias the lug 55 and the upper jaw piece upwardly relative to the lower jaw piece. Arms 56 and 61 extending laterally from the upper and lower jaw pieces 50 and 51, respectively, in the same direction. Freely rotatable rigid balls 64 are mounted on the jaw pieces, two for each thereof.

Figure 3:
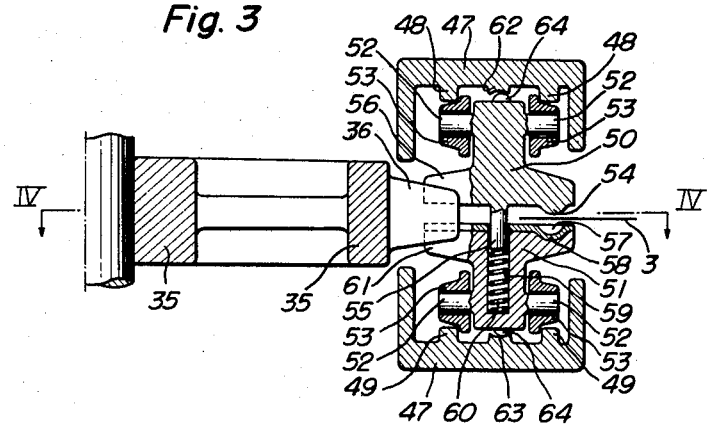
FIG. 3 is a cross sectional view substantially taken along the line III—III in FIGS. 2 and 4.
Figure 4:
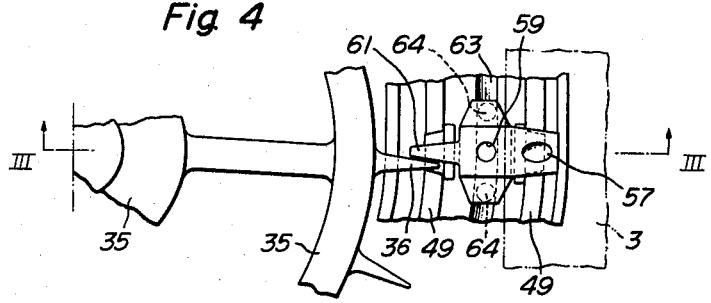
FIG. 4 is a fragmentary plan view showing a part of one of the two endless guide tracks adjacent the rear end thereof and substantially taken along the line IV—IV in FIG. 3.
Figure 5:
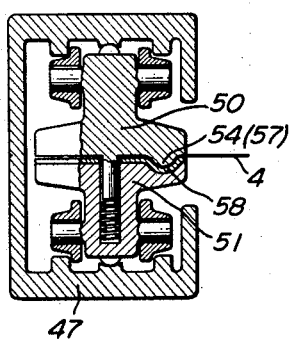
FIG. 5 is a cross sectional view substantially taken along the line V—V in FIG. 2.
Figure 6:
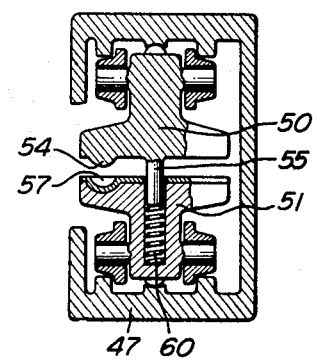
FIG. 6 is a cross-sectional view substantially taken along the line VI—VI in FIG. 2.

The endless guide track members are constructed and arranged as shown in FIGS. 3 to 6, inclusive. The cross sectional configuration of each of the guide track members slightly varies along its circular extent. FIG. 3 represents a cross section of one of the guide track members 47 substantially taken along the line III—III in FIG. 2, the guide member having such cross section in all of its regions adjacent the sprocket wheels 35, 39 and 43. FIG. 5 represents a cross section substantially taken along the line V—V in FIG. 2. The guide track member 47 has a cross section as shown in FIG. 5 along its portion extending from the region adjacent the sprocket wheel 35 to that adjacent the wheel 39. FIG. 6 represents a cross section of the guide track member 47 substantially taken along the line VI—VI in FIG. 2, the guide track member having the same cross sectional configuration along its portion extending from the region adjacent to the sprocket wheel 39 to that adjacent to the wheel 35 except the region adjacent to the intermediate sprocket 43. Further, the guide track member 47 is slightly upwardly inclined from point 29 to point 31 in FIG. 2 and slightly downwardly inclined from point 31 to 33, extending horizontally over the entire remaining portion.

Numerals 48–49, 62–63 designate guide rails formed on the guide track member 47 inside the top and bottom thereof for conducting the successive film-clamps by way of the wheels 53 and rigid balls 64 mounted thereon. The upper pair of wheel guide rails 48 and the lower pair of wheel guide rails 49 are sufficiently spaced apart from each other along those portions of the endless guide track member which have either of the cross sections shown in FIGS. 3 and 6 to allow the semispherical projection 54 and the cooperating semispherical recess 57 of each film-clamp to be completely disengaged from each other as it passes such portions of the guide track member. Similarly, the upper and lower pairs of wheel guide rails 48 and 49 are spaced apart so as to maintain the projection 54 and the recess 57 of each film-clamp in full engagement or close contact with each other as the clamp passes that portion of the guide track member as shown in FIG. 5.

The sprocket wheels 35, 39 and 43 arranged in the guide track member 47 will now be described in detail in connection with FIG. 3, which illustrates the sprocket wheel 35. The other two sprocket wheels 43 and 39 are generally similar to the wheel 35 except that the wheel 39 has less teeth 36 than that of wheel 35 and the wheel 43 has a slightly smaller diameter and also less teeth 36 than the wheel 35.

The sprocket wheel 35 is provided on the periphery thereof with regularly spaced apart teeth 36 each in the form of a radially outwardly extending plate. The teeth 36 are disposed to engage the arms 56, 61 on each of the successive film-clamps to advance the latter through the endless guide track. The sprocket wheel 35 per se is driven by a variable speed drive means, not shown.

Though the guide means has been described and shown largely in connection with one of the opposite endless guide tracks 47 comprising the guide means, it will be understood that the other guide track 46 is similarly arranged and constructed.

The operation of the apparatus described above in the stretching of flat thermoplastic films will now be described.

Initially, an unstretched flat film 3 is threaded between the feed rolls 6–6a and further between the pull rolls 7—7a to be wound on the take-up roll 2. The film at the inlet end of the guide means is inserted in the film-clamps 10 and 11 in a manner as shown in FIG. 3. Then, the entire driving system of the apparatus is started and simultaneous film stretching in both a longitudinal and transverse direction is obtained.

Thus, the unstretched film 3 is moved under tension by pull rolls 7–7a, which rotate at a peripheral speed higher than the feed rolls 6–6a, to cause the film to be stretched longitudinally.

Meanwhile, the unstretched film 3 is disposed relative to the clamps as shown in FIG. 3 when the clamps are located at points 10 and 11 in FIG. 2, but at the next moment the clamps will be driven by the sprocket wheels 34, 35 to positions 12, 13, respectively, where the film is firmly clamped between the jaw faces of each of the film clamps with the projection 54 and recess 57 held in full engagement with each other preventing the film therebetween from slipping in either direction, longitudinal or transverse.

The film-clamps cannot proceed around the endless guide tracks by themselves but can readily be driven under external forces owing to the wheels 53 and rigid balls 64 mounted on the clamp even if the forces be slight.

Accordingly the clamps, after being engaged with the film, are pulled along the endless guide tracks by the proceeding motion of the film.

Thus, as the film proceeds along the endless guide tracks, it is subjected to a restricting action against a tendency to shrink in the transverse direction due to the longitudinal stretch of the film and as a result, it is substantially stretched in the transverse direction. When the endless guide tracks are forwardly divergent as shown in FIG. 2, the film is stretched in the transverse direction with a ratio more than 1.0.

The film-clamps having proceeded to points 21–20 will immediately be engaged by the teeth 36 of rotary sprocket wheels 39–38, when the film is positioned relative to the clamps again as shown in FIG. 3. In other words, the spacing between the upper and lower guide rails 48–49 is relatively large adjacent sprocket wheels 38–39 so that the upper jaw piece 50 of the clamp is moved upwardly under the action of the spring 60 to interrupt the interengagement between the projection 54 and complementary recess 57 as the clamp comes in contact with sprockets 38, 39. As a result, the film is released from the clamps to proceed independently thereof. The clamps, now free from the film, are driven by the teeth of the sprocket wheels 39–38 to points 23–22 and further to points 25–24. The clamps are thereafter pushed forward by succeeding clamps until they reach points 27–26, where they are engaged by fast-moving teeth 36 of the sprocket wheels 43–42 to run up the slightly upwardly inclined guide sections between points 29–31 and 28–30. The clamps upon reaching points 31–30 will run down the slightly downwardly inclined guide sections under the influence of gravity toward points 33–32 to follow the preceding clamps. At 33–32, the clamps are again engaged by the teeth 36 of the sprocket wheels 35–34 to complete a circular trip around the guide track members 47–46. It will be understood that the clamps will repeat the above cyclic operation as long as the apparatus continues to operate.

The clamps are preferably employed in large numbers, the rotation of the sprocket wheels 35–34 being controlled in accordance with the speed of the feed rolls 6–6a so that the clamps may successively engage the adjacent marginal edges of the unstretched film to start therewith. Similarly, the sprocket wheels 39–38 are adjusted to rotate at a speed such that the clamps are carried away at a speed higher than that at which they are started.

The film-clamps which have engaged the marginal edges of the unstretched film leave the sprocket wheels 35–34 to proceed at spacings increasing as the film 4 is stretched longitudinally, as seen in FIG. 2. Accordingly, in order to obtain with the film at all times a predetermined transverse stretch, at least one pair of succeeding clamps should enter the parallel section of the guide tracks before each pair of clamps have released the film 4 at points 21–20. It should be understood that a parallel section of the guide tracks 46–47 is provided for this purpose and has a length sufficient to meet the above requirements.

As apparent from the foregoing description of one preferred embodiment of the present invention and its operation, the inventive apparatus has a major feature that it is provided with film-clamps arranged independently from each other so that they may be advanced by the very film which is being stretched during the film stretching process, whereby the flat film may be stretched simultaneously in both longitudinal and transverse directions.

The invention is not restricted to the features described above and shown in the drawings but may be varied in many ways within the scope of the appendant claims.

Though in the illustrated embodiment wheels and rigid balls are employed to facilitate the travel of the film-clamps within the guide tracks, the film-clamps and guide tracks may be modified by substituting bearings and rollers for the wheels and rigid balls so that the clamps may readily be advanced along guide rails, or, inversely, a multitude of rolls may be mounted on the guide tracks so that the film-clamps may lightly be advanced over such rolls.

Further, the film engaging portions of the clamps may take the form of flat plates or corrugated plates etc. as commonly used with the clamps of tentering machines for woven fabrics, as long as they are constructed so as to firmly engage the film against slippage relative to the clamps under tension in both longitudinal and transverse directions of the film.

With the apparatus of the present invention, it will be observed that the areas of the film which are in engagement with the clamps remain substantially unstretched and thus the resulting stretched film include along its marginal portions spaced unstretched regions, which are relatively thick, and intermediate regions which are longitudinally stretched to a greater extent than the remaining portions of the film. The longitudinal sections of the film including the relatively highly stretched regions thus tend to be necked in or reduced in width. In order to reduce the necking-in thereby to smooth the stretching of the entire film, it is desirable to increase the number of clamps while minimizing the width thereof and hence the longitudinal extent of the engaged areas of the film. The width of the clamps is generally selected within the range of from approximately 15 to 35 millimeters, and preferably at about 20 millimeters, the longitudinal extent of the engaged film areas being suitably selected at about half the clamp width.

As the stretched film leaving the pair of endless guide track members toward the pull rolls is irregular in thickness along the opposite marginal edges as indicated above, it is preferable to dispose in front of the pull rolls a number of freely rotatable guide rolls and adjacent trimming means known per se to cut off the opposite marginal portions of the film so that the remaining web portion of uniform thickness alone may reach the pull rolls, or to reduce the width of the pull rolls so that only the film portion having uniform thickness may be nipped between the pull rolls. Other suitable measures may also be employed to deal with this problem.

Where the clamp jaws are constructed as those commonly used in tentering machines for woven fabric, the opening device for such clamp jaws may also be constructed in the same manner as with tentering machines.

Means for returning film-clamps after film stretching operation to their initial position may conceivably take various forms depending upon the shape of the clamps and the configuration of the guide tracks, as will readily be understood.

Films of some sorts of thermoplastic resin are known to be stretchable at ordinary temperature, but even such films are preferably heated to a suitable extent during stretching operation so that they may be stretched more smoothly and to a greater extent. Moreover, there are many other sorts of film material such as high density polyethylene, crystalline polypropyrene, polystyrene, polycarbonates, and polyesters, which are not stretchable at ordinary temperature. Under such circumstances, it is also preferable to provide heater means above and below the endless guide track means and hence the film being stretched or in encircling relation thereto. The heater means may employ any of known heating media such as infrared rays, hot air, electric heat, high frequency induction, steam and hot water. The heater form may suitably be selected according to the heat source employed and the configuration of each endless guide track means.

The inventive apparatus has conveniently been described and shown in connection with the stretching of films preliminarily wound on a bobbin, but it may be employed in direct connection with an extrusion machine so that the film extruded through the T-die mounted on the extruder head and then solidified by cooling may subsequently be stretched on the inventive apparatus, which may prove its unrivaled industrial merits all the more when used in this manner.

Further, though the apparatus has been described hereinbefore as a film stretching means, it may also be utilized by slight modification as a means for effecting thermal stabilization of films while allowing shrinkage thereof within predetermined limits simultaneously in both longitudinal and transverse directions. Also, by connecting such modified apparatus with the illustrated one film stretching and thermal stabilization may be performed continuously all at once.

It will also be apparent to those skilled in the art that a multi-stage stretching apparatus may readily be built up by combining two or more sets of the apparatus described above. It is to be understood that all these and other changes, modifications and combinations fall within the scope of the invention.

It will be appreciated from the foregoing description that the present invention has the following advantageous characteristic features.

Firstly, a film web may be continuously stretched simultaneously in both longitudinal and transverse directions. Secondly, stretched film may be obtained which is uniform in properties in all directions with the same degree of stretch used in both longitudinal and transverse directions. This is one of the advantages particularly in the stretching of polypropylene film having crystalline polymer as a main ingredient.

Thirdly, with the apparatus according to the present invention, various ratios between longitudinal and transverse stretches may be relatively easily selected as required to produce films having properties varying over a wide range.

Fourthly, as one of the important characteristic features of the inventive apparatus, it is adapted to achieve a longitudinal stretch which is natural or reasonable in conformity with the transverse stretch.

Also, it is apparent that the inventive apparatus is simple in construction and robust.

Films which are stretchable in accordance with the method of the present invention include those formed of thermoplastic resins such as crystalline polypropylene, polyesters, polycarbonates, various sorts of polyethylene, polyvinyl chloride, polystyrene, polyamides, copolymer of vinylidene chloride and vinyl chloride, polyurethanes, and polyurea.

Some practical examples will now be given to illustrate the method of the present invention.

Example 1

Polypropylene was employed which has a reduced viscosity of 1.7 as determined by a tetralin solution having a concentration of 0.1 g./100 cc. at 135° C. and which has a crystalline polymer content of 97% determined as remainder remnants when extracted with n-heptane at its boiling point. The stock was melted and extruded in the usual manner through the T-die at 290° C., and was immediately chilled on the surface of a cooling roll interiorly cooled with water of ordinary temperature to give an unstretched 0.30 mm. thick film which was used as specimen.

The unstretched film was passed over a preheat roll of 110° C. surface temperature to be preliminarily heated at about 100° C. and then was introduced into the above described apparatus of the invention, in which the film was continuously stretched at the stretch ratio of 4.0 and simultaneously in both longitudinal and transverse directions, to give a biaxially uniformly stretched transparent film 0.019 mm. thick. The heating of film during stretching was performed by hot air circulation.

The stretched film obtained was well balanced in both longitudinal and lateral directions, having a tensile strength of 18/17 kg./mm.$^2$; an elongation of 24/28%; and a tear strength as determined by Elemendorf method of 30/35 g./0.025 mm. The numerical figures represent (value in longitudinal direction)/(value in transverse direction) for respective properties. For example, the stretched film exhibited a tensile strength of 18 kg./mm.$^2$ in the longitudinal direction and of 17 kg./mm.$^2$ in the transverse direction. The same expression will also be employed in the following examples.

Example 2

Polypropylene having a reduced viscosity of 1.9 and a crystalline polymer content of 92% was melted and extruded in the usual manner through the T-die at about 300° C., and then chilled by passing through a water bath at 25° C. to form an unstretched film of 0.25 mm. thickness, which was used as specimen.

The unstretched film was preheated to approximately 90° C. by passing through an infrared preheating zone and subsequently introduced into the inventive apparatus, in which the film was continuously biaxially stretched at 125° C. at the stretch ratios of 5.0 and 1.0 in the longitudinal and the transverse directions, respectively, to form a uniformly stretched transparent film of 0.05 mm. thickness. During stretching, the film was heated by infrared radiation on opposite sides thereof.

The film obtained exhibited a tensile strength of 25/3.5 kg./mm.$^2$, an elongation of 35/75%, and a tear strength of 7/25 g./0.025 mm.

Example 3

Polyethylene telephthalate was melted and extruded in the usual manner and was chilled by passing through a water bath of ordinary temperature to form an unstretched film 0.22 mm. thick, as which was used as specimen.

The unstretched film was preheated by passing over a preheat roll having 70° C. surface temperature and then introduced into the inventive apparatus, in which the film was stretched continuously and simultaneously in both longitudinal and transverse directions at a stretch ratio of 3.0 to give a uniformly stretched transparent film of 0.024 mm. thickness. During stretching the film was heated by circulation of hot air.

The film obtained exhibited a tensile strength of 17/15 kg./mm.$^2$ and an elongation of 120/140%, being well-balanced in both longitudinal and transverse directions.

Example 4

Polyethylene telephthalate was melted and extruded in the usual manner through T-die and then was chilled by passing through an ordinary temperature water bath to form an unstretched film 0.45 mm. thick to be used as specimen.

This unstretched film was stretched in the same manner as in Example 3 except that the stretch ratios 5.0 and 3.0 were used in the longitudinal and transverse directions, respectively, and a uniformly stretched transparent film of 0.03 mm. thickness was obtained.

The film obtained had a tensile strength of 28/18 kg./mm.$^2$ and an elongation of 45/84%.

Example 5

Poly-2,2-(4,4'-diphenyl) propane carbonate was melted and extruded at 300° C. through T-die in the usual manner and chilled by passing through cold water to give an unstretched film of 0.12 mm. thickness, which was used as specimen.

This unstretched film was preheated to approx. 100° C. and then introduced into the apparatus of the present invention, in which the film was biaxially and simultaneously stretched at 150° C. at the stretch ratio of 2.0 in both longitudinal and transverse directions to obtain a uniformly stretched transparent film of 0.03 mm. thickness.

The film obtained had a tensile strength of 12/11 kg./mm.$^2$ and an elongation of 40/60%, being well-balanced in both longitudinal and transverse directions.

Example 6

Polyethylene of 0.95 density was melted and extruded at 290° C. through the T-die as in the usual manner and then chilled by passing through a cooling water bath to form an unstretched film of 0.08 mm. thickness, which was subsequently directed over a preheat roll having the surface temperature of 80° C. directly the inventive apparatus, which forms together with the preceding components a combined extruding and stretching unit and in which the heated unstretched film was stretched continuously and simultaneously in both longitudinal and transverse directions at 110° C.

The stretch ratio was 2.0 in both directions and the film was heated by hot air while being stretched.

The film obtained had a tensile strength of 5/5 kg./mm.$^2$ and an elongation of 630/500%.

Example 7

Polyvinyl chloride compound was 3% of dibutyl tin maleate and 1% of calcium stearate was melted and extruded through the T-die at 190° C. in the usual manner and chilled by passing through a cooling water bath held at 10° C. to form a 0.2 mm. thick unstretched film, which was used as specimen.

This unstretched film was introduced into the inventive apparatus and stretched continuously and simultaneously in both longitudinal and transverse directions at the stretch ratio of 2.5 to give a uniformly stretched 0.03 mm. thick film.

The film obtained had a tensile strength of 13/12 kg./mm.$^2$, an elongation of 50/60%, and a tear strength of 8/10 g./0.025 mm., being well balanced in both longitudinal and transverse directions.

*Example 8*

Polystyrene was melted and extruded through the T-die at 230° C. in the usual manner, solidified by passing over a cooling roll having 115° C. surface temperature and immediately introduced into the inventive apparatus, in which the film was stretched continuously and simultaneously in both longitudinal and transverse directions to give a uniformly stretched 0.02 mm. thick transparent film.

The stretching ratio of 3.0 was used in both directions and the film being stretched was held at 115° C. by heating.

The resulting stretched film exhibited a tensile strength of 7.5/7.5 kg./mm.$^2$ and an elongation of 14/14%, being well balanced in both longitudinal and transverse directions.

*Example 9*

Polycaproamide was melted and extruded through the T-die at 235° C. in the usual manner and chilled by passing through a water bath of ordinary temperature to form a 0.22 mm. thick unstretched film, which was used as specimen.

This unstretched film was introduced into the inventive apparatus and simultaneously stretched at the stretch ratio of 3.0 in both longitudinal and transverse directions.

The stretched film obtained exhibited a tensile strength of 18/18 kg./mm.$^2$, and an elongation of 60/85%, being well balanced in both longitudinal and transverse directions.

What is claimed is:

The claim apparatus for stretching extruded thermoplastic film in transverse and longitudinal directions comprising feed rollers and pull rollers, said pull rollers turning at a peripheral speed which is at least equal to the peripheral speed of the feed rollers, two diverging guide rails on opposite sides of the path of the thermoplastic film between the feed rollers and the pull rollers, and gripping devices carried by the diverging guide rails, said gripping devices being moved independently of each other along the guide rails by the stretched thermoplastic film.

References Cited by the Examiner

UNITED STATES PATENTS

| | | |
|---|---|---|
| 2,618,012 | 11/1952 | Milne. |
| 2,728,941 | 1/1956 | Alles et al. |
| 2,755,533 | 7/1956 | Miller. |
| 2,841,820 | 7/1958 | Pfeiffer. |
| 2,923,966 | 2/1960 | Tooke et al. |
| 3,014,234 | 12/1961 | Koppehele. |

ALFRED L. LEAVITT, *Primary Examiner.*

WILLIAM J. STEPHENSON, MORRIS LIEBMAN, ALEXANDER H. BRODMERKEL, *Examiners.*